United States Patent
Mathew

(10) Patent No.: US 8,600,171 B2
(45) Date of Patent: Dec. 3, 2013

(54) IMAGE LABELING USING PARALLEL PROCESSING

(75) Inventor: Manoj Mathew, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 12/635,588

(22) Filed: Dec. 10, 2009

(65) Prior Publication Data

US 2011/0142303 A1 Jun. 16, 2011

(51) Int. Cl.
*G06K 9/56* (2006.01)

(52) U.S. Cl.
USPC ............ 382/205; 358/1.9; 358/403; 382/180; 382/305

(58) Field of Classification Search
USPC ........... 358/1.9, 403; 382/128, 173, 177, 180, 382/205, 305
See application file for complete search history.

(56) References Cited

U.S. PATENT DOCUMENTS

| | | | |
|---|---|---|---|
| 4,991,224 A | 2/1991 | Takahashi et al. | |
| 5,199,083 A | 3/1993 | Takeda | |
| 5,239,596 A | 8/1993 | Mahoney | |
| 5,305,393 A | 4/1994 | Kawai et al. | |
| 5,305,395 A | 4/1994 | Mahoney et al. | |
| 5,943,663 A | 8/1999 | Mouradian | |
| 5,956,468 A * | 9/1999 | Ancin | 358/1.9 |
| 6,367,698 B1 * | 4/2002 | Yamamoto et al. | 235/462.11 |
| 6,643,400 B1 * | 11/2003 | Murakawa et al. | 382/195 |
| 6,701,010 B1 * | 3/2004 | Katsuyama | 382/165 |
| 6,731,801 B2 * | 5/2004 | Murakawa et al. | 382/180 |
| 7,340,113 B2 | 3/2008 | Ozaki et al. | |
| 7,912,286 B2 * | 3/2011 | Ozaki et al. | 382/180 |
| 7,974,471 B2 * | 7/2011 | Matsuno | 382/180 |
| 2001/0043741 A1 | 11/2001 | Mahoney et al. | |
| 2002/0054173 A1 | 5/2002 | Miller et al. | |
| 2003/0234782 A1 | 12/2003 | Terentyev et al. | |
| 2006/0112293 A1 * | 5/2006 | Przybysz et al. | 713/400 |
| 2006/0274940 A1 | 12/2006 | Ozaki et al. | |
| 2008/0112604 A1 | 5/2008 | Lloyd | |
| 2010/0177980 A1 * | 7/2010 | Bajo et al. | 382/257 |
| 2011/0142303 A1 * | 6/2011 | Mathew | 382/128 |

OTHER PUBLICATIONS

Manohar et al., "Connected Component Labeling of Binary Images on a Mesh Connected Massively Parallel Processor," Computer Vision, Graphics, and Image Processing, vol. 45, No. 2, 133-149 (Feb. 1989).

(Continued)

*Primary Examiner* — Gregory M Desire
(74) *Attorney, Agent, or Firm* — Fitzpatrick, Cella, Harper & Scinto

(57) ABSTRACT

Image data which includes a feature is labeled. The image data is comprised of pixel data in an N×M array. At least one pixel is designated and flagged. Asynchronous processes are executed, where each process corresponds to exactly one pixel. Each process sets a flag only for the owner pixel and only if a connected neighbor pixel in the pre-defined path is flagged. Each process inspects pixel data for all neighbor pixels of the owner pixel to determine if a neighbor pixel is a connected pixel and if the neighbor pixel is flagged, and continues until it sets the flag for the owner pixel or until all connected horizontal and vertical neighbor pixels have been inspected without encountering a connected neighbor pixel whose flag is set. The asynchronous processes are repeated until a pre-defined condition has been satisfied. All flagged pixels are labeled.

36 Claims, 10 Drawing Sheets

(56) References Cited

OTHER PUBLICATIONS

Wang et al., "Parallel Execution of a Connected Component Labeling Operation on a Linear Array Architecture," Journal of Information Science and Engineering, vol. 19, 353-370 (2003).

Samet, "Connected Component Labeling Using Quadtrees," Journal of the Association for Computing Machinery, vol. 28, No. 3, 487-501 (Jul. 1981).

Beare, "Optimization of Connected Component Labelling" (Mar. 2, 2006).

Johansson et al., "A New Parallel MIMD Connected Component Labeling Algorithm," Lecture Notes in Computer Science; vol. 817, 801-804 (1994).

Han et al., "An Efficient and Fast Parallel-Connected Component Algorithm," Journal of the Association for Computing Machinery, vol. 37, No. 3, 626-642 (Jul. 1990).

Matsuno, et al., "High Speed Connected Component Labeling as a Killer Application for Image Recognition Systems by Dynamically Reconfigurable Processor," available at http://www.design-reuse.com/articles/12608/high-speed-connected-component-labeling-as-a-killer-application-for-image-recognition-systems-by-dynamically-reconfigurable-processor.html (last visited Dec. 9, 2009).

Alnuweiri et al., "Parallel Architectures and Algorithms for Image Component Labeling," IEEE Transactions on Pattern Analysis and Machine Intelligence, vol. 14, No. 10, 1014-1034 (Oct. 1992).

Luo et al., "Canny Edge Detection on NVIDIA CUDA," CVPRW '08, IEEE Computer Society Conference on Computer Vision and Pattern Recognition Workshops, 1-8 (2008).

Babenko et al., "MinGPU: a minimum GPU library for computer vision," Journal of Real-Time Image Processing, vol. 3, No. 4, 255-268 (Dec. 2008).

Apostolakis et al., "New SIMD Algorithms for Cluster Labeling on Parallel Computers" (Sep. 1992).

Nassimi et al., "Finding Connected Components and Connected Ones on a Mesh-Connected Parallel Computer," SIAM Journal on Computing, vol. 9, No. 4, 744-757 (Nov. 1980).

Miller et al., "Varying Diameter and Problem Size in Mesh-Connected Computers," Proceedings of the 1985 International Conference on Parallel Processing, 697-699 (1985).

Kumar et al., "Parallel Geometric Algorithms for Digitized Pictures on Mesh of Trees," Proceedings of the 1986 International Conference on Parallel Processing, 270-273 (1986).

Miller et al., "Data Movement Techniques for the Pyramid Computer," SIAM Journal on Computing, vol. 16, No. 1, 38-60 (Feb. 1987).

Cypher et al., "Hypercube and Shuffle-Exchange Algorithms for Image Component Labeling," Journal of Algorithms, vol. 10, 140-150 (1989).

Cypher et al., "An EREW PRAM Algorithm for Image Component Labeling," IEEE Transactions on Pattern Analysis and Machine Intelligence, vol. 11, No. 3, 258-262 (Mar. 1989).

Agrawal et al., "A Parallel O(log N) Algorithm for Finding Connected Components in Planar Images," Proceedings of the 1987 International Conference on Parallel Processing, 783-786 (1987).

\* cited by examiner

DIRECTED WALKER APPROACH
(ONLY ONE DIRECTION SHOWN)
| | |
|---|---|
| 1. INSPECT THE NEXT PIXEL IN THE PRE-DEFINED PATH TO SEE IF IT IS CONNECTED AND FLAGGED. | 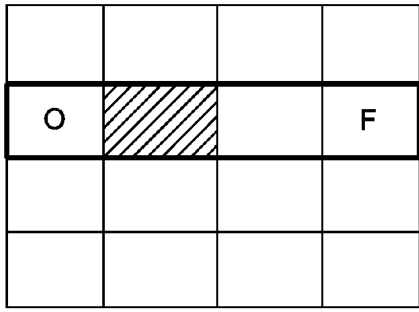 701 |
| 2. CONTINUE INSPECTING SUBSEQUENT PIXEL IN PRE-DEFINED PATH TO SEE IF IT IS CONNECTED AND FLAGGED. | 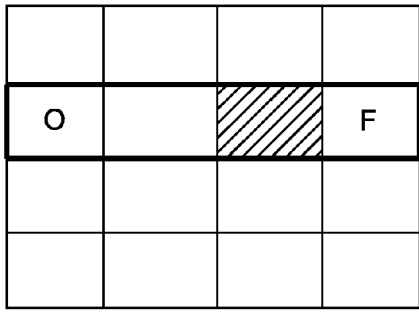 702 |
| 3. INSPECTION REACHES FLAGGED PIXEL. | 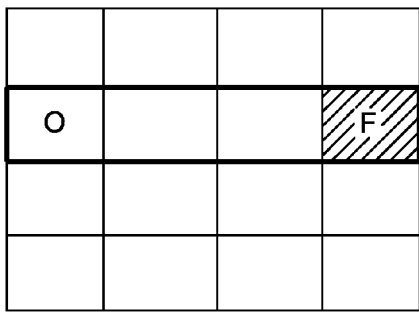 703 |
| 4. FLAG OWNER PIXEL AND TERMINATE PROCESS. | 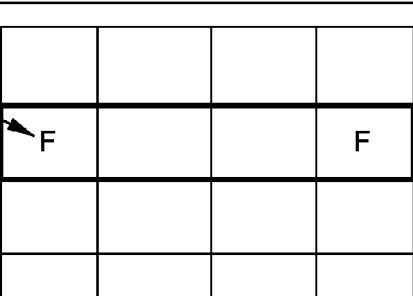 704 |
FIG. 7

| STEPS | IMAGE |
|---|---|
| ITERATION 1 | FEATURE 1, FEATURE 2, FEATURE 5, FEATURE 4, FEATURE 3 |
| ITERATION 2 | FEATURE 1, FEATURE 2, FEATURE 5, FEATURE 4, FEATURE 3 |
| ITERATION 3 | FEATURE 1, FEATURE 2, FEATURE 5, FEATURE 4, FEATURE 3 |
| ITERATION 4 | FEATURE 1, FEATURE 2, FEATURE 3 |

1001, 1002, 1003, 1004

1005 — FEATURE 1, FEATURE 2, FEATURE 3

FIG. 10

IMAGE LABELING USING PARALLEL PROCESSING

FIELD

The present disclosure relates to labeling of connected components in an image.

BACKGROUND

In the field of image processing, it is common to identify connected components in an image for the purpose of labeling the connected components. For example, a physician analyzing a digital radiogram may designate some pixels of various regions of interest, such as a few pixels in the outline of the lung of a chest radiograph. A labeling operation is then performed to automatically identify and label pixels connected to the designated region.

One method of labeling involves sequentially scanning each pixel to determine if that pixel is associated with a connected object. Pixels determined to be associated with a connected object are labeled with an object identifier. Object identifiers of pixels are stored in memory for later identification of connected objects. Additional scans are performed to harmonize the varying object identifiers of pixels associated with different objects.

SUMMARY

Conventional image labeling has been known to be time consuming, and it has been considered to process the image in multiple parallel threads of operation.

One difficulty with such parallel processing is that processing for each pixel is dependent on the outcome of other pixels in the image. For example, processes for some pixels may need to be delayed until other pixels finish processing. This synchronization between pixels can significantly increase processing time, and may require a significant amount of memory to temporarily save pixel data.

The foregoing is addressed by labeling images using a multi-parallel operation, in which there is one asynchronous process for each and every pixel in the image, and in which each process is constrained to modify only its owner pixel and no other pixel. Each process for each pixel is therefore independent of the processes for other pixels.

Thus, in an example embodiment described herein, image data is labeled in which the image data is comprised of pixel data for each of plural pixels arranged in an N×M array of pixels, and in which the image data includes a feature. A designation of at least one pixel included in the feature is received, and a flag for the designated pixel is set.

According to the embodiment, N×M parallel asynchronous processes are executed. Each such process respectively corresponds to exactly one owner pixel in the N×M array of pixels and each process is constrained to set a flag only for the owner pixel and no other pixels.

In particular, each process inspects pixel data for horizontal and vertical neighbor pixels of the owner pixel to determine if a neighbor pixel is a connected pixel and if the neighbor pixel is flagged. Each process sets the flag only for the owner pixel and only if the flag for a connected horizontal or vertical neighbor pixel of the owner pixel is set. Each process continues to check subsequent horizontal and vertical neighbor pixels of the owner pixel until the process sets the flag for the owner pixel or until all connected horizontal and vertical neighbor pixels have been inspected without encountering a connected pixel whose flag is set.

The above step of initiating execution of N×M parallel asynchronous processes is repeated upon termination of all of the N×M processes until a pre-defined condition has been satisfied. All flagged pixels are labeled as being part of the feature.

By using separate and independent processing threads for each and every pixel in the image, it is ordinarily possible to label image elements more quickly and efficiently. Specifically, since each pixel is constrained to modify only the owner pixel and no other pixel, each pixel process is not dependent on other pixels and there is no need to synchronize processes between different pixels. As a consequence, it is ordinarily possible to reduce the overall processing time and the amount of memory required for the labeling operation.

In one example embodiment, the image data is a medical image which includes image data for an anatomical feature, and the labeling labels the anatomical feature.

In another example embodiment, the image data is binarized before initiating execution of any of the N×M parallel asynchronous processes, and the pixel value of each flagged pixel is changed back to its corresponding pixel value in the non-binarized image after the labeling step is performed on the binarized image data.

In still another example embodiment, the multi-parallel operation is performed by a general purpose computer which has a CPU interfaced to a general-purpose graphics processing unit (GPGPU) having a single instruction-multiple data stream (SIMD) architecture.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 7 is a view for explaining the "Directed Walker" approach used in the asynchronous process for each pixel.

FIG. 10 illustrates an example execution of the labeling operation using the "Directed Walker" approach as applied to the image shown in FIG. 9.

DETAILED DESCRIPTION

Figure 1:
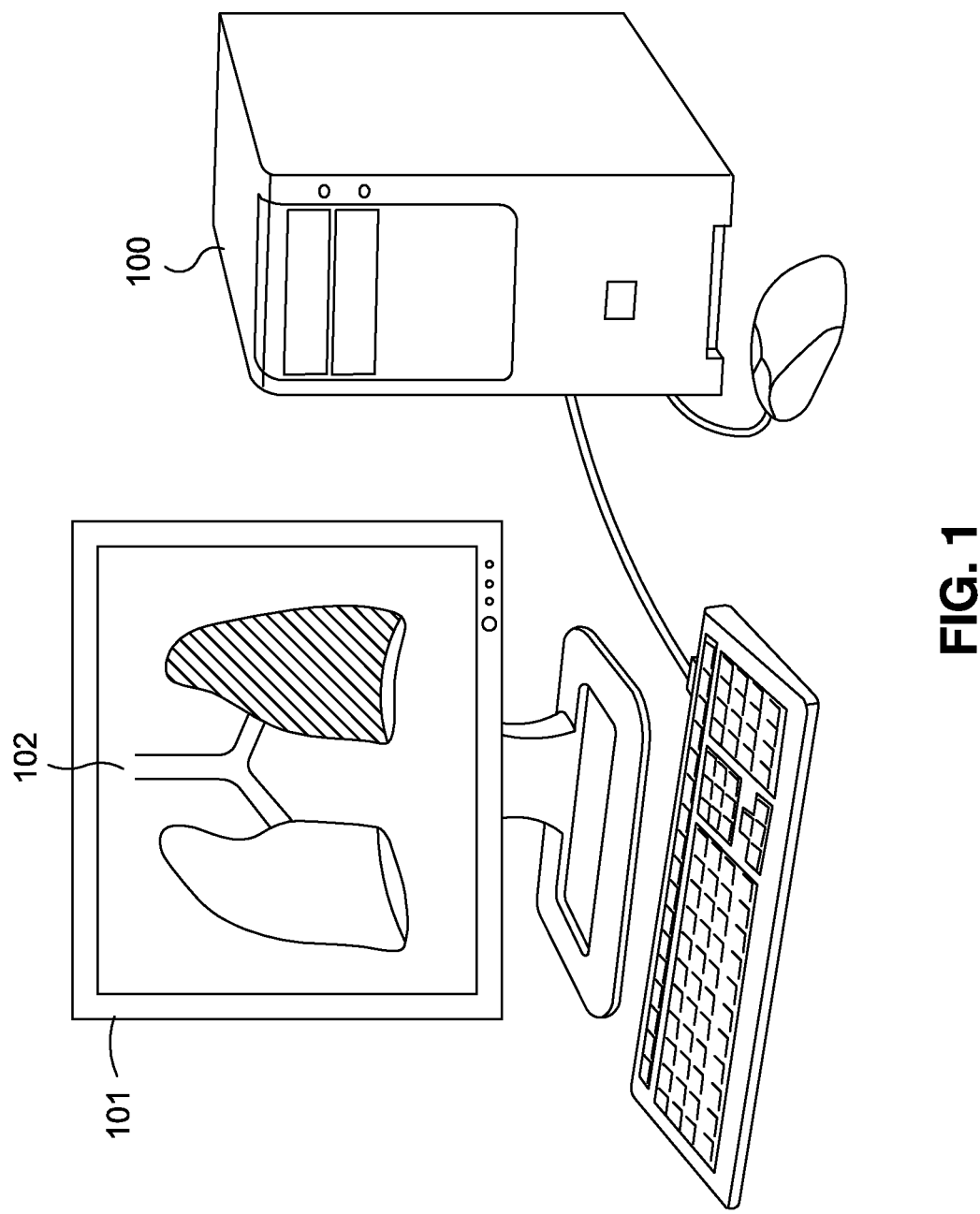
FIG. 1 illustrates an example embodiment of an environment in which aspects of the present disclosure may be practiced.

FIG. 1 illustrates an example environment in which aspects of the present disclosure may be practiced. Computer 100 generally comprises a programmable general purpose personal computer having an operating system, such as Microsoft® Windows® or Apple® Mac OS® or LINUX, and which is programmed as described below so as to perform particular functions and, in effect, become a special purpose computer when performing these functions. As shown in FIG. 1, computer 100 displays a labeled medical image 102 on the display screen 101.

Host computer 100 also includes computer-readable memory media, such as fixed disk 45 (shown in FIG. 2), which is constructed to store computer-readable information, such as computer-executable process steps or a computer-executable program for causing a computer to perform a method for labeling image data which includes a feature, as described more fully below.

While FIG. 1 depicts a computer, computing equipment for practicing aspects of the present disclosure can be implemented in a variety of embodiments. For example, in an image processing environment, the computer equipment might be included in a digital camera, digital video recorder, or graphics tablet. In a medical image processing environment, the computing equipment might be a CT scanner or X-ray machine. Additionally, other embodiments are possible according to the application and environment.

While FIG. 1 depicts medical image data, this disclosure is not limited to this context. For example, the labeling operation might also label segments of geographical information system (GIS) image data, a region of interest extracted from image data, or a feature in a moving image.

Figure 2:
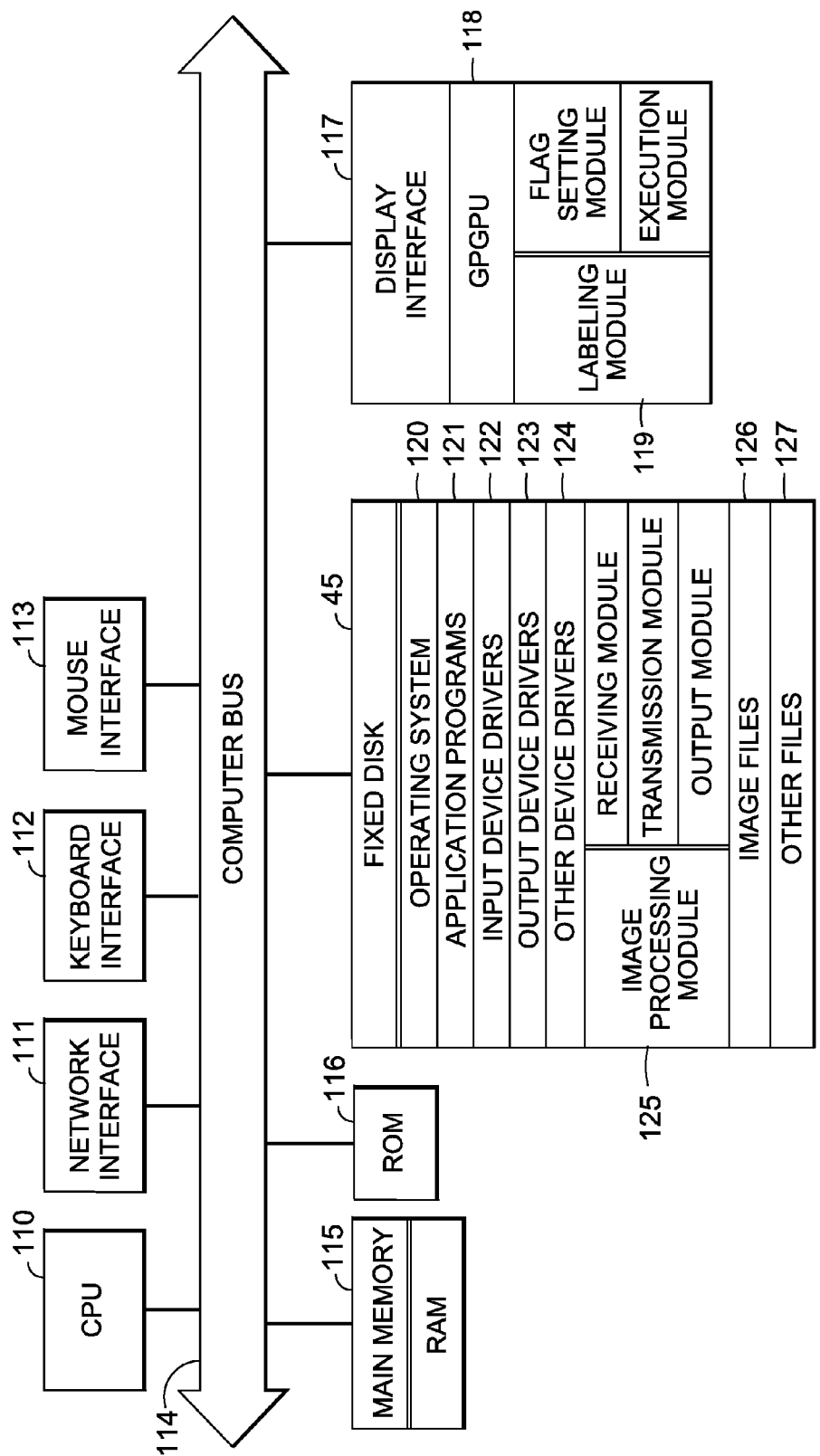
FIG. 2 is a detailed block diagram depicting the internal architecture of the host computer shown in FIG. 1.

FIG. 2 is a detailed block diagram depicting the internal architecture of the computer 100 shown in FIG. 1. As shown in FIG. 2, host computer 100 includes central processing unit (CPU) 110 which interfaces with computer bus 114. Also interfacing with computer bus 114 are fixed disk 45 (e.g., a hard disk or other nonvolatile storage medium), network interface 111, keyboard interface 112, mouse interface 113, random access memory (RAM) 115 for use as a main runtime transient memory, read only memory (ROM) 116, and display interface 117 for display screen 101, which includes GPGPU 118 and labeling module 119.

RAM 115 interfaces with computer bus 114 so as to provide information stored in RAM 115 to CPU 110 during execution of the instructions in software programs, such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data, such as image data, designated pixels, flagged pixels, or other information, can be stored in RAM 115 so that the data can be accessed by CPU 110 during the execution of the computer-executable software programs, to the extent that such software programs have a need to access and/or modify the data.

As also shown in FIG. 2, fixed disk 45 contains computer-executable process steps for operating system 120, and application programs 121, such as word processing programs or graphic image management programs. Fixed disk 45 also contains computer-executable process steps for device drivers for software interface to devices, such as input device drivers 122, output device drivers 123, and other device drivers 124. Image files 126, including scanned image files, are available for image labeling. In addition, image files 126 and other files 127, are available for output to output devices and for manipulation by application programs.

Figure 4:
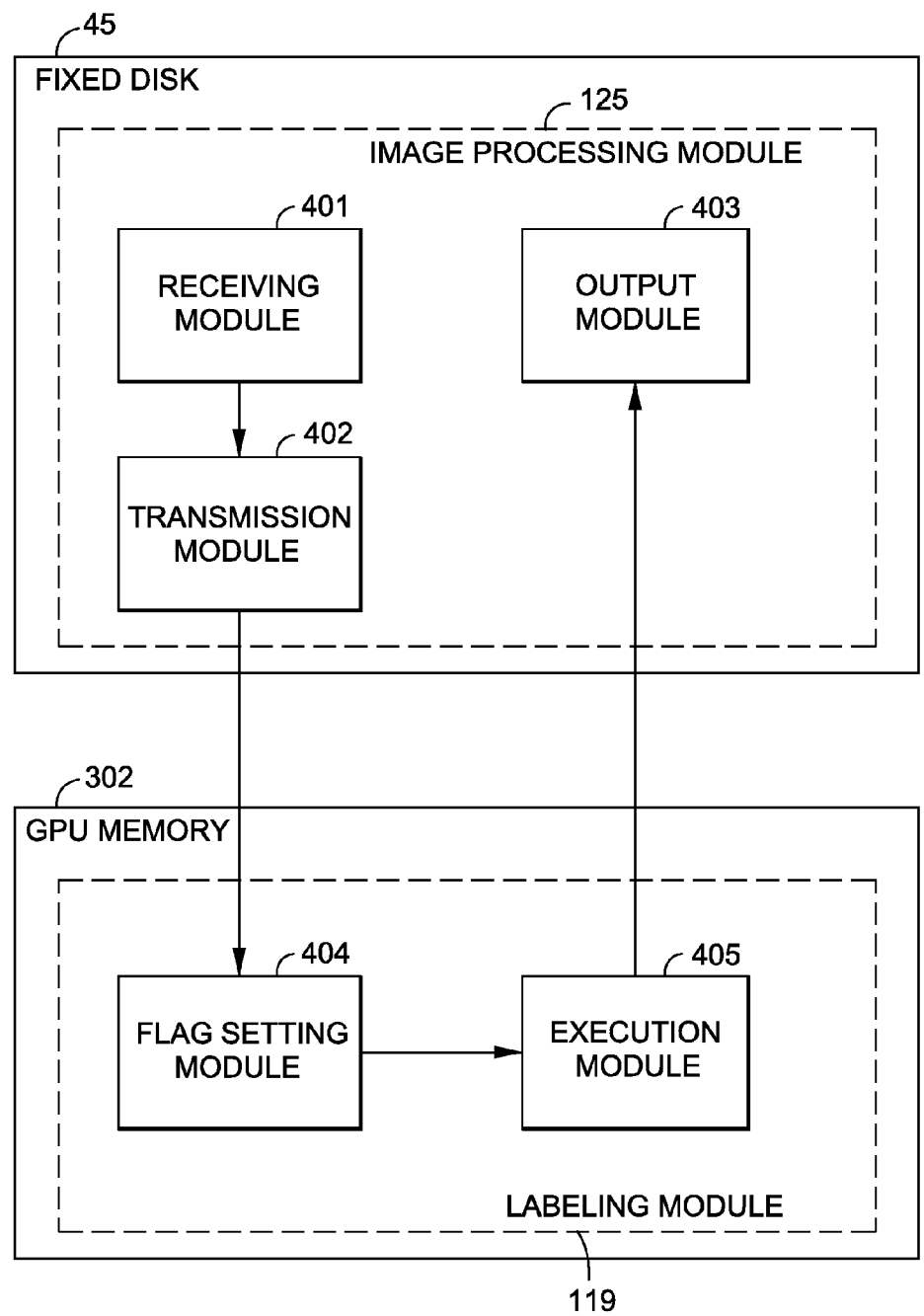
FIG. 4 illustrates examples of an image processing module and a labeling module used to label image data.

Image processing module 125 comprises computer-executable process steps for performing image labeling using parallel processing. Image processing module 125 generally comprises a receiving module, a transmission module, and an output module, as shown in FIG. 4.

More specifically, image processing module 125 is configured to receive a designation of at least one pixel included in a feature, i.e., component, and to subsequently transmit image data along with the designated pixels from CPU 110 to GPGPU 118. In addition, image processing module 125 is configured to receive flags for the pixels from GPGPU 118 at CPU 110, and to label all pixels whose flags are set as part of the feature. These processes will be described in more detail below.

Labeling module 119 comprises computer-executable process steps for performing image labeling using parallel processing. Labeling module 119 generally comprises a flag setting module and an output module, as shown in FIG. 4.

More specifically, labeling module 119 is configured to set a flag in GPGPU 118 for each pixel corresponding to each designated pixel. In addition, labeling module 119 is configured to initiate execution of N×M parallel asynchronous processes and perform the labeling operation. These processes will also be described in more detail below.

The computer-executable process steps for image processing module 125 may be configured as part of operating system 120, as part of an output device driver, such as an image processing driver, or as a stand-alone application program. Image processing module 125 may also be configured as a plug-in or dynamic link library (DLL) to the operating system, device driver or application program. In one example embodiment described herein, image processing module 125 is incorporated directly into the operating system for host computer 100. In another example embodiment described herein, labeling module 119 may be stored in GPU memory 302, as depicted in FIG. 4. It can be appreciated that the present disclosure is not limited to these embodiments and that the disclosed modules may be used in other environments.

The labeling operation will now be described in connection with various embodiments with respect to FIGS. 3 to 10. According to this disclosure, a "designated" pixel is a pixel that has been designated for labeling. An "owner" pixel is a pixel that is associated with an asynchronous process that can modify the owner pixel. A "neighbor" pixel is a pixel that is located along a pre-defined path, originating from the owner pixel. A "connected" pixel is a neighbor pixel that has either the same pixel value as the owner pixel or a pixel value that falls within a pre-defined pixel value range. Thus, a "connected neighbor" pixel is a pixel that is located along a pre-defined path and has either the same pixel value as the owner pixel or a pixel value that falls within a pre-defined pixel value range.

Figure 3:
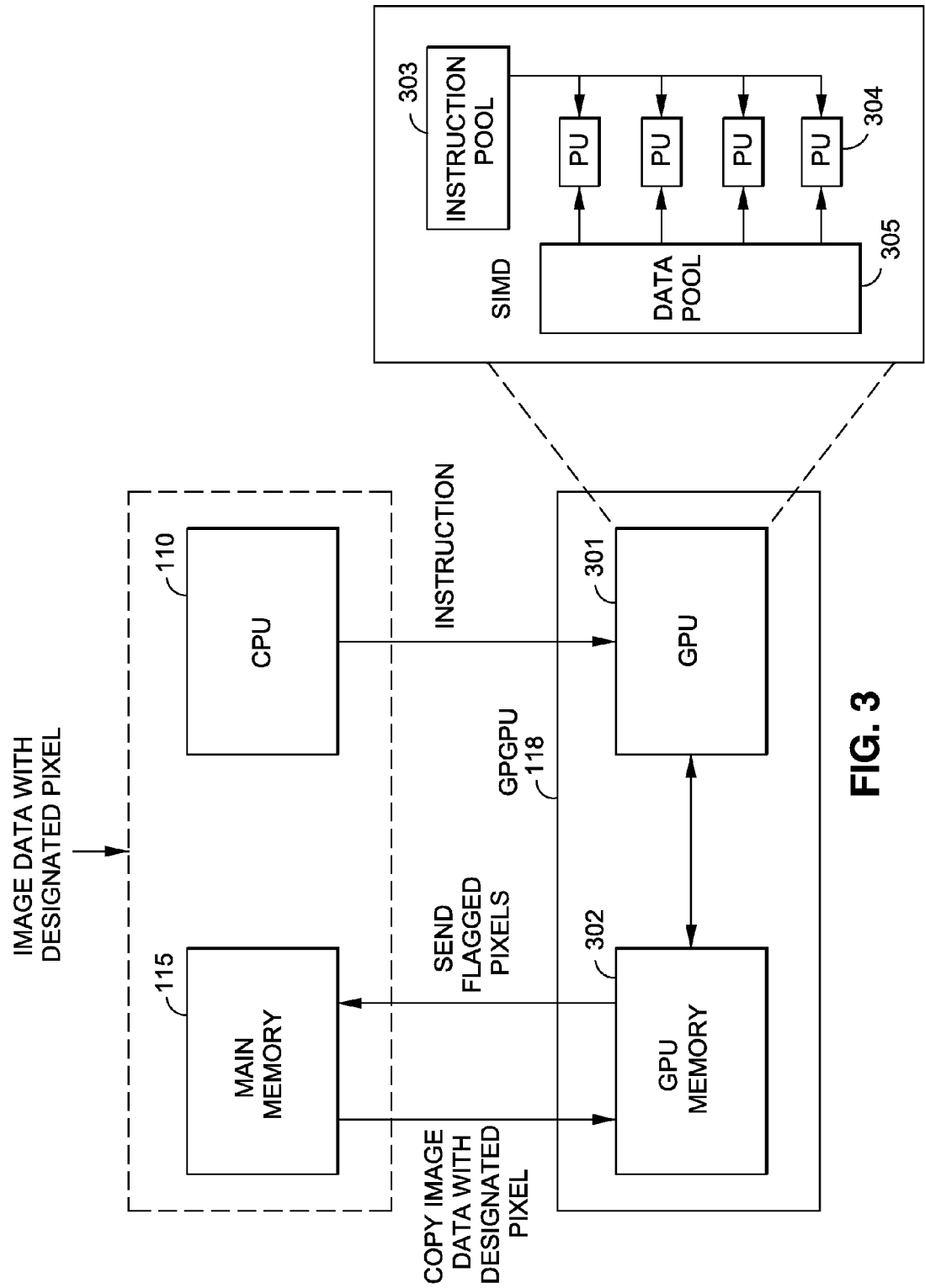
FIG. 3 is a block diagram illustrating one example of a GPGPU communicating with a CPU.

FIG. 3 is a block diagram illustrating one example of a GPGPU communicating with a CPU. GPGPU 118 is a general-purpose graphics processing unit (GPU), a parallel-processing device that is ordinarily designed to render computer graphics, and that also performs calculations for non-graphics data traditionally handled by a CPU. One example GPGPU configuration uses an NVIDIA-based GPU that is programmed using the Compute Unified Device Architecture (CUDA) software development kit (SDK). Another example GPGPU configuration uses an ATI-based GPU that is programmed using the Stream SDK. GPGPU 118 includes GPU 301, which performs calculations as instructed by CPU 110. GPGPU 118 also includes GPU memory 302, which receives image data along with designated pixels from main memory 115, to be processed by GPU 301. For purposes of simplicity, only basic components of GPGPU 118 are shown and a detailed explanation of the components of GPGPU 118 is not provided herein.

In FIG. 3, GPGPU 118 has a SIMD architecture. SIMD, short for single instruction-multiple data stream, is a type of parallel computing architecture that allows a single computer instruction to perform an identical action simultaneously on multiple pieces of data using multiple processing units. In one example, an instruction is sent from instruction pool 303 to PU (processing unit) 304, where PU 304 performs the instruction using data from data pool 305.

In one embodiment, GPGPU 118 is used to perform labeling of image data. In particular, a designation of at least one pixel included in the feature can be received in CPU 110. The image data, along with the designated pixel, can then be sent from the main memory 115 via computer bus 114 to GPU memory 302. GPU 301 sets the flag for the designated pixel.

According to the embodiment, GPU 301 executes N×M parallel asynchronous processes. Each such process respectively corresponds to exactly one owner pixel in the N×M array of pixels and is constrained to set a flag only for the owner pixel and no other pixels. In particular, each process inspects pixel data for horizontal and vertical neighbor pixels of the owner pixel to determine if a neighbor pixel is a connected pixel and if the neighbor pixel is flagged. Each process sets the flag only for the owner pixel and only if the flag for a connected horizontal or vertical neighbor pixel of the owner pixel is set. Furthermore, each process continues to check subsequent horizontal and vertical neighbor pixels of the owner pixel until the process sets the flag for the owner pixel or until all connected horizontal and vertical neighbor pixels have been inspected without encountering a connected pixel whose flag is set.

The execution of N×M parallel asynchronous processes is repeated in GPU 301 upon termination of all of the N×M processes in GPU 301 until a pre-defined condition has been satisfied, as described more fully below. GPGPU 118 then transfers all flags to CPU 110, and CPU 110 labels all flagged pixels as part of the feature.

FIG. 4 illustrates examples of an image processing module and a labeling module used to label image data.

In particular, FIG. 4 illustrates one example of image processing module 125 in which the sub-modules of image processing module 125 are included in fixed disk 45. Specifically, FIG. 4 illustrates one example of an image processing module 125 for labeling image data which includes a feature, where the method is performed by a general purpose computer which has a CPU interfaced to a GPGPU having a SIMD architecture. As shown in FIG. 4, image processing module 125 comprises a number of sub-modules, as described more fully below. Each of the sub-modules are computer-executable software code or process steps executable by a processor, such as CPU 110, and are stored on a computer-readable storage medium, such as fixed disk 45 or RAM 115. More or less modules may be used than shown in FIG. 4, and other architectures are possible.

As shown in FIG. 4, image processing module 125 includes receiving module 401, transmission module 402, and output module 403, while labeling module 119 includes flag setting module 404 and execution module 405.

In the configuration shown in FIG. 4, image processing module 125 includes a receiving module 401 that is configured to receive in CPU 110 a designation of at least one pixel included in the feature. Image processing module 125 also includes a transmission module 402 for sending image data and the designation of pixels from CPU 110 to GPGPU 118. Additionally, image processing module 125 further includes an output module 403 that is configured to label all pixels in CPU 110 whose flags are set by GPU 301 as part of the designated feature.

FIG. 4 also illustrates one example of labeling module 119, in which the sub-modules of labeling module 119 are stored at display interface 117, and can be accessed by GPGPU 118. Specifically, FIG. 4 illustrates one example of a labeling module 119 for labeling image data which includes a feature, where the method is performed by a general purpose computer which has a CPU interfaced to a GPGPU having a SIMD architecture. As shown in FIG. 4, labeling module 119 comprises a number of sub-modules, as described more fully below. Each of the sub-modules are computer-executable software code or process steps executable by a processor, such as GPU 301, and are stored on a computer-readable storage medium, such as GPU memory 302. More or less modules may be used than shown in FIG. 4, and other architectures are possible.

As mentioned earlier, labeling module 119 includes a flag setting module 404 that is configured to set in GPU 301 a flag for each designated pixel received by receiving module 401.

In addition, labeling module 119 includes an execution module 405 that is configured to initiate execution of N×M parallel asynchronous processes in GPGPU 118, where each such process respectively corresponds to exactly one owner pixel in the N×M array of pixels and is constrained to set a flag only for the owner pixel and no other pixels. In particular, each process inspects pixel data for horizontal and vertical neighbor pixels of the owner pixel to determine if a neighbor pixel is a connected pixel and if the neighbor pixel is flagged. Each process sets the flag only for the owner pixel and only if the flag for a connected horizontal or vertical neighbor pixel of the owner pixel is set. Furthermore, each process continues to check subsequent horizontal and vertical neighbor pixels of the owner pixel until the process sets the flag for the owner pixel or until all connected horizontal and vertical neighbor pixels have been inspected without encountering a connected pixel whose flag is set.

Execution of N×M parallel asynchronous processes can be repeated in GPGPU 118 upon termination of all of the N×M processes in GPGPU 118 until a pre-defined condition has been satisfied.

Figure 5:
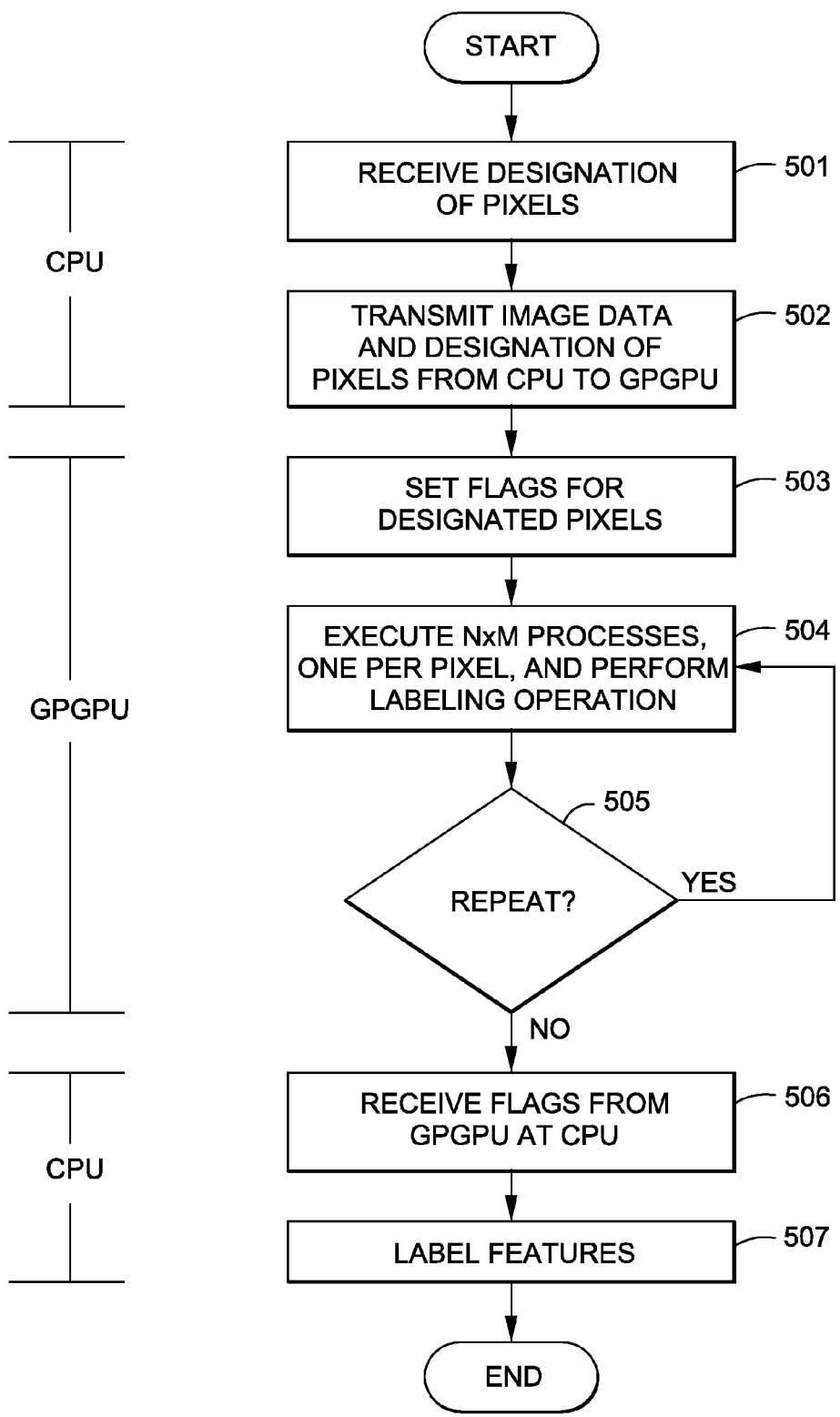
FIG. 5 is a flowchart illustrating an example process for image labeling using parallel processing.

FIG. 5 is a flowchart illustrating an example process for image labeling using parallel processing.

Briefly, in FIG. 5, labeling is performed by a general purpose computer which has a CPU interfaced to a GPGPU having a SIMD architecture. The general purpose computer performs labeling on image data that includes a feature, where the image data is comprised of pixel data for each of plural pixels arranged in an N×M array of pixels. A designation of at least one pixel included in the feature is received in CPU 110, and image data, including the designated pixels, are transmitted from CPU 110 to GPGPU 118. GPGPU 118 sets a flag for each designated pixel. Additionally, N×M parallel asynchronous processes are executed in GPGPU 118, where each process respectively corresponds to exactly one owner pixel in the N×M array of pixels. Each asynchronous process independently performs a labeling operation, as discussed more fully below with respect to FIGS. 6 to 8. The execution of N×M parallel asynchronous processes is repeated in GPGPU 118 upon termination of all of the N×M processes, until a pre-defined condition has been satisfied. All flagged pixels are received from GPGPU 118 at CPU 110, and are subsequently labeled by CPU 110 as being part of the feature.

In more detail, in step 501, a designation of at least one pixel is received in CPU 110, for a feature included in the image data. For example, the designation of pixels may be made by manually selecting the pixels using a keyboard via keyboard interface 112, a mouse via mouse interface 113, a display via display interface 117, or via a graphics tablet apparatus (not shown). In another example, pixels that match a certain pixel value or pixel range may also be designated. For example, the system or a user may specify designation of all pixels that have a pixel value between 200 and 255. Each designated pixel is associated with a particular feature in the image data, and signifies that pixels connected to the designated pixel are to be labeled.

In step 502, image data is transmitted together with the designated pixels from CPU 110 to GPGPU 118. For example, the transmission of image data and the designated pixels may be made by sending the data from CPU 110 via computer bus 114 to GPGPU 118.

In step 503, GPGPU 118 sets a flag for each pixel corresponding to each designated pixel. A pixel may be flagged by, for example, updating a data element corresponding to the designated pixel. In one example, data elements corresponding to designated pixels may be stored in a data structure, such as an array. In another example, data elements corresponding to designated pixels may be stored in secondary storage, such as a file or database.

In step 504, GPGPU 118 executes N×M parallel asynchronous processes. Each process respectively corresponds to exactly one owner pixel in the N×M array of pixels. Each process independently performs a labeling operation, as discussed more fully with respect to FIGS. 6 to 8. The operation of each asynchronous process is completely independent of other processes. As such, each process operates in a non-synchronized manner and has no provision for communicating with other processes via message or token passing. In this regard, the flag for each owner pixel is constrained to only be modified by the asynchronous process that corresponds to that owner pixel.

In step 505, image labeling process determines if execution of N×M asynchronous processes should be repeated upon termination of all N×M asynchronous processes from the previous iteration. Specifically, the image labeling process makes this determination by evaluating whether a pre-defined condition has been satisfied. Determination of whether a pre-defined condition has been satisfied may vary according to application or preference.

In one example, the pre-defined condition is satisfied if every pixel associated with a feature or features has been flagged. In another example, the pre-defined condition is satisfied if N×M parallel asynchronous processes have been executed for a specified number of iterations. For example, for certain types of image data, nine iterations may be sufficient to perform labeling of the feature or features. In still another example, the pre-defined condition is satisfied once there is an insignificant change in the number of flags set by the processes in the previous iteration. If the pre-defined condition is satisfied, then the image labeling process proceeds to step 506. Otherwise, the image labeling process proceeds to step 504, where the execution of N×M asynchronous processes is repeated.

In step 506, CPU 110 receives the flags from GPGPU 118. Specifically, the flags received by CPU 110 identify the pixels that have been identified for labeling by GPGPU 118.

In step 507, CPU 110 labels all flagged pixels as part of the feature.

In one embodiment, the above steps can be performed on each frame of a moving image. In other words, a feature included in a video stream can be identified by separately labeling each frame in the video stream.

In another embodiment, the above steps can be performed on image data that further comprises pixel data for a third dimension O so as to form an N×M×O array of pixels, and where the method is performed for each N×M array of pixels in the O dimension. In other words, the image data can be composed of voxels, i.e., three-dimensional pixels. In such a case, the above steps are performed on each N×M array of pixels for each frame in the O dimension, and the results are merged together to produce a labeled three-dimensional image.

In still another embodiment, the above steps can be performed on a medical image which includes image data for an anatomical feature, such that the labeling labels the anatomical feature. In other embodiments, the above steps can be performed on GIS image data, such that the labeling labels a feature or features in a digital map.

The asynchronous process for each pixel will now be described in further detail with respect to FIGS. 6 to 8.

Figure 6A:
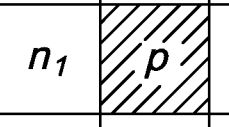
FIGS. 6A and 6B are views for explaining selection of pre-defined paths for each asynchronous process.
Figure 6B:
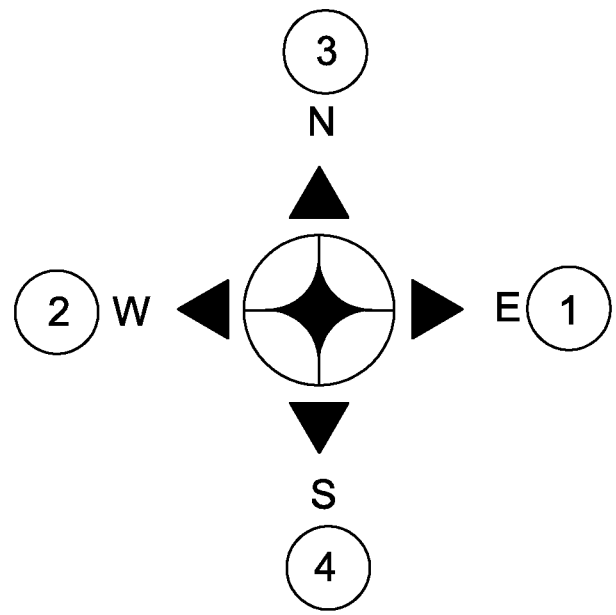

Each asynchronous process proceeds along one or more pre-defined paths. The paths are traversed in sequence, originating from the owner pixel. FIG. 6A and 6B are views for explaining selection of pre-defined paths for each asynchronous process.

As shown in FIG. 6A, each pixel p is encompassed by pixels in the $n_1$, $n_2$, $n_3$, $n_4$, $n_5$, $n_6$, $n_7$, and $n_8$ directions. A pre-defined path sequence may include paths in any or all of these directions.

While the examples below refer mainly to traversing paths in the north, south, east, and west ($n_3$, $n_7$, $n_1$, $n_5$) directions, other paths are possible. In one embodiment, diagonal neighbor pixels of the owner pixel are also inspected. For example, in addition to examining neighbor pixels located in the $n_3$, $n_7$, $n_1$, and $n_5$ directions, the pre-defined path may also be configured to examine all diagonal neighbor pixels located in the $n_2$, $n_4$, $n_6$, and $n_8$ directions.

FIG. 6B is a view for explaining one example path sequence. In the example of FIG. 6B, the process sequentially inspects pixel data for all connected pixels to the east of the owner pixel. Then, the process sequentially inspects all connected pixels to the west of the owner pixel. Then, the process sequentially inspects all connected pixels to the north of the owner pixel. Finally, the process sequentially inspects all connected pixels to the south of the owner pixel. Stated otherwise, the path sequence sequentially inspects neighbor pixels located in the $n_5$, $n_1$, $n_3$, and $n_7$ directions, as shown in FIG. 6A. Of course, other path sequences are also possible.

FIG. 7 is a view for explaining a "Directed Walker" approach used in the asynchronous process for each pixel. More specifically, and with reference to FIG. 6A, FIG. 7 shows an asynchronous process associated with owner pixel O inspecting pixel data for each neighbor pixel in the $n_5$ direction.

In the example of FIG. 7, the connected pixels are the four horizontal pixels surrounded in bold. A flagged pixel is labeled with the letter "F". The pixel currently being inspected by the asynchronous process is depicted with a shaded background.

In step 701, the process inspects pixel data for the next neighbor pixel along the pre-defined path to determine if the neighbor pixel is connected to owner pixel O and if the neighbor pixel is flagged. In this case, the process determines that the next neighbor pixel is a connected pixel that has not been flagged.

In step 702, the process continues to the next neighbor pixel in the pre-defined path to determine if the neighbor pixel is connected to owner pixel O and if the neighbor pixel is flagged. Again, the process determines that the neighbor pixel under inspection is a connected pixel that has not been flagged.

In step 703, the process further continues inspecting pixel data for the next neighbor pixel in the pre-defined path to determine if the neighbor pixel is connected to owner pixel O and if the neighbor pixel is flagged. Here, the process determines that the neighbor pixel under inspection is both a connected pixel and is flagged.

Accordingly, in step 704, the asynchronous process sets the flag for the owner pixel, as indicated by the inclusion of the letter "F" within the borders of the owner pixel O. The asynchronous process then terminates and ceases execution of the labeling operation.

Figure 8:
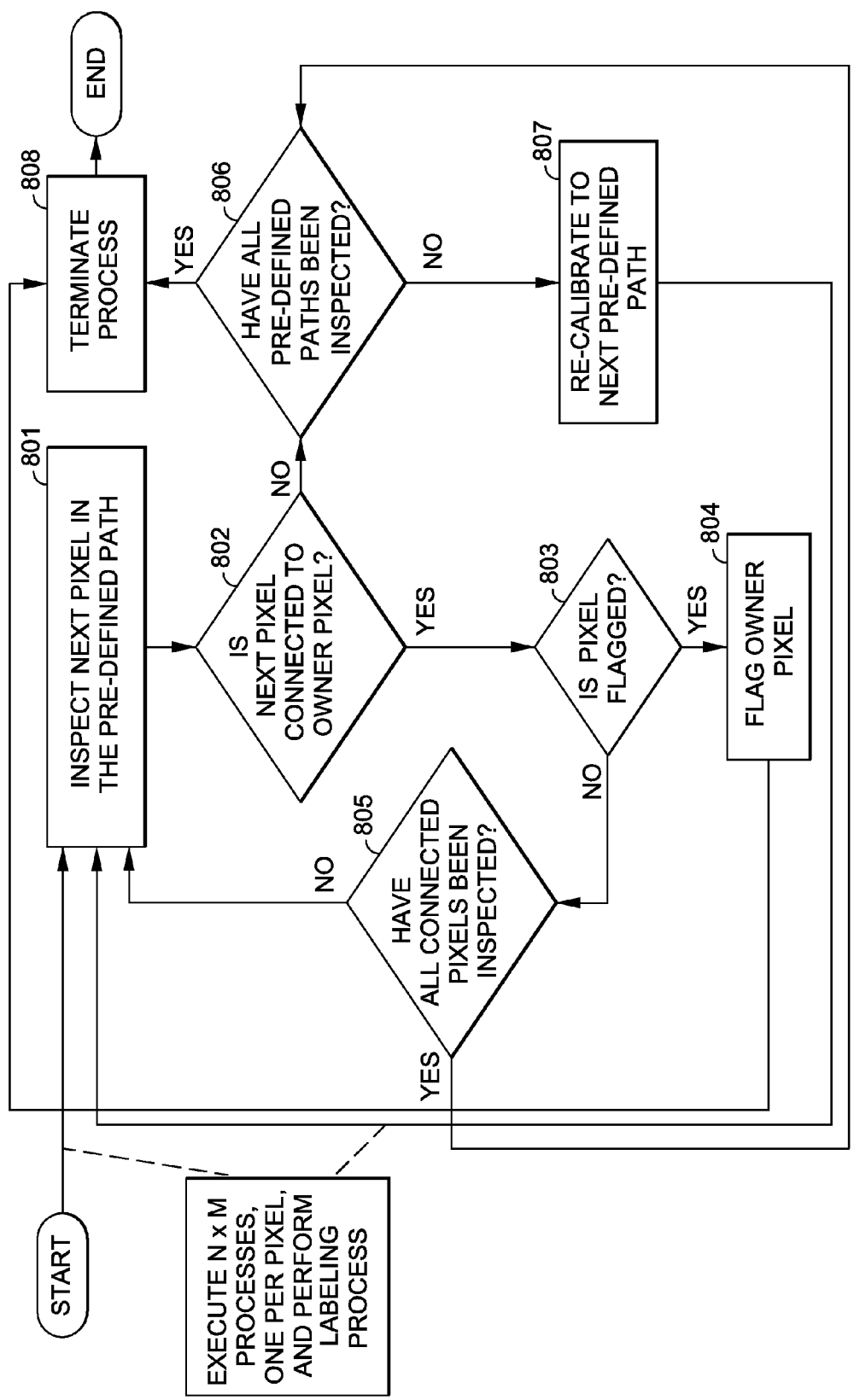
FIG. 8 is a flowchart illustrating an example asynchronous process executed for each pixel.

FIG. 8 is a flowchart illustrating an example asynchronous process executed for each pixel.

Briefly, in FIG. 8, each executed N×M parallel asynchronous process inspects pixel data for horizontal and vertical neighbor pixels of the owner pixel to determine if a neighbor pixel is a connected pixel and if the neighbor pixel is flagged. In particular, each process sets the flag only for the owner pixel and only if the flag for a connected horizontal or vertical neighbor pixel of the owner pixel is set. Moreover, each process continues to check subsequent horizontal and vertical neighbor pixels of the owner pixel until the process sets the flag for the owner pixel or until all connected horizontal and vertical neighbor pixels have been inspected without encountering a connected pixel whose flag is set.

In more detail, in step 801, the asynchronous process for the owner pixel sequentially inspects pixel data for the next pixel along the pre-defined path.

In step 802, the asynchronous process determines if the inspected neighbor pixel is a connected pixel. In other words, each process determines if the neighbor pixel under inspection is connected to the owner pixel. In this regard, a neighbor pixel is connected to the owner pixel if the pixel value for the neighbor pixel matches the pixel value for the owner pixel. Stated differently, an identical pixel value between the neighbor pixel and the owner pixel signifies continuity between the two pixels and the neighbor pixel is therefore deemed a connected pixel. Alternatively, a neighbor pixel may also be connected to the owner pixel if the pixel value for the neighbor pixel falls within a pre-defined pixel value range. If it is determined that the neighbor pixel under inspection is connected to the owner pixel, then the asynchronous process proceeds to step 803. Otherwise, if it is determined that the neighbor pixel under inspection is not connected to the owner pixel, then the asynchronous process proceeds to step 806.

In step 803, the asynchronous process determines if the connected neighbor pixel is also flagged. If the neighbor pixel under inspection is flagged, then the asynchronous process proceeds to step 804. Otherwise, the asynchronous process proceeds to step 805.

In step 804, since the connected neighbor pixel is flagged, the asynchronous process flags the owner pixel. In that regard, each process sets the flag only for the owner pixel and only if the flag for the neighbor pixel is set. Thus, each owner pixel can be flagged only once by its own process, and no other process can alter the flag of the owner pixel. Once the owner pixel is flagged, the asynchronous process proceeds to step 808, where the asynchronous process terminates and ceases execution.

In step 805, the asynchronous process determines if all connected pixels in the pre-defined path have been inspected. For example, the asynchronous process may reach a neighbor pixel located in the path that is not connected. If the asynchronous process determines that there are more connected pixels in the pre-defined path to be inspected, the process continues to step 801 to inspect the next neighbor pixel in the pre-defined path. Otherwise, the asynchronous process proceeds to step 806.

In step 806, the asynchronous process determines if all paths in the pre-defined path sequence have been inspected. If the asynchronous process determines that not all paths in the pre-defined path sequence have been inspected, the process proceeds to step 807. Otherwise, the asynchronous process proceeds to step 808, where the asynchronous process terminates and ceases execution.

In step 807, the asynchronous process changes its direction of inspection to the next path in the pre-defined path sequence. The process then proceeds to step 801 to inspect neighbor pixels located in the new path. For example, a process that has completed inspection of all neighbor pixels in the $n_5$ direction may continue inspecting neighbor pixels in the $n_1$ direction, a direction which had not been previously inspected.

An example execution of labeling an image will now be described with respect to FIGS. 9 and 10.

Figure 9A:
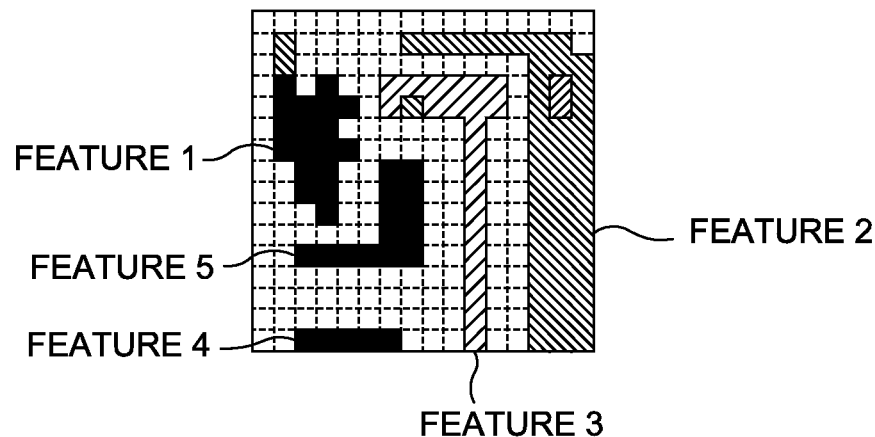
FIGS. 9A and 9B are views for explaining a designation of pixels in an image, and binarization of the image including the designated pixels.
Figure 9B:
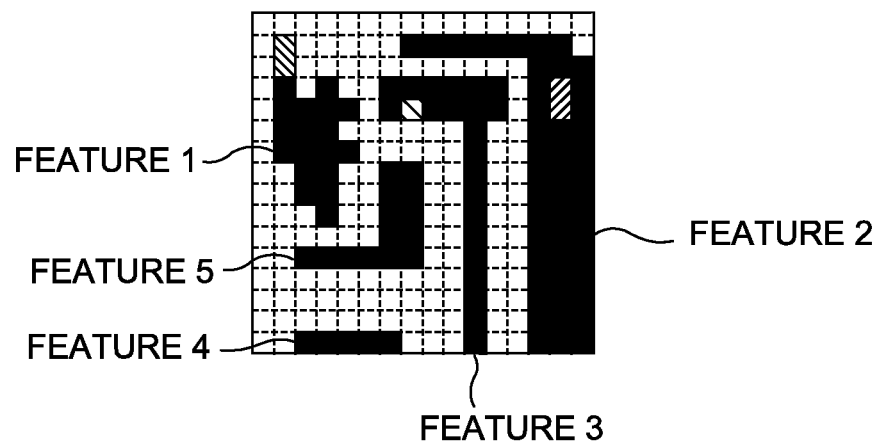

FIGS. 9A and 9B are views for explaining a designation of pixels in an image, and binarization of the image including the designated pixels.

FIG. 9A illustrates image data with five distinct features. Typically, a pixel is designated in a feature that has been selected for labeling. In FIG. 9A, pixels have been designated in Features 1, 2, and 3. Thus, a flag is set for each of these designated pixels. Consequently, only features with designated pixels will be labeled during the labeling operation, whereas features without designated pixels will not.

In one embodiment, the image data can be binarized in order to distinguish the feature or features from the remaining image data. Binarization ordinarily involves pre-defining a threshold pixel value that is calibrated to distinguish between the desired features from the remaining image data.

In one example, the binarization process involves duplicating the image data into a separate data structure, such as a binarization array, and converting the pixel value for each non-designated pixel to either a one or a zero in the binarization array. The conversion of pixel values to either a one or a zero depends on whether the pixel value for the non-designated pixel is greater than or less than the threshold pixel value. Typically, at the conclusion of the binarization process, all pixels associated with features in the image data have a pixel value of one, whereas the remaining pixels, i.e., background pixels, have a pixel value of zero.

FIG. 9B illustrates the same image shown in FIG. 9A in binarized form. The binarization process transforms the image data into a black-and-white image to facilitate the labeling operation. In FIG. 9B, pixels associated with features are colored black, while the remaining background pixels are colored white. In addition, pixels that were previously designated for labeling in FIG. 9A, i.e., designated pixels, are shown with stripes and remain untouched by the binarization process.

Upon completion of the binarization process, N×M parallel asynchronous processes are executed, as described above. Each asynchronous process then independently performs the labeling operation on the binarized image data.

Once labeling is complete, the pixel value for each flagged pixel is changed back to its original pixel value, i.e., the pixel value for that pixel before the binarization process, and the remaining pixel values are set as background pixels. As a consequence, the original image data displays only the labeled features while leaving out all undesired pixels.

FIG. 10 illustrates an example execution of the labeling operation using the "Directed Walker" approach as applied to the image shown in FIG. 9.

N×M parallel asynchronous processes are executed for each iteration shown in FIG. 10. Each asynchronous process respectively corresponds to exactly one owner pixel in the N×M array of pixels. Furthermore, in applying the Directed Walker approach, each process inspects neighbor pixels located in the east, west, north, and south ($n_5$, $n_1$, $n_3$, $n_7$) direction to determine if any connected pixels have been flagged.

In step 1001, each process sequentially inspects each neighbor pixel located in the east, west, north, and south direction to determine if that neighbor pixel is a connected pixel that has been flagged. In Feature 1, only neighbor pixels located south of the designated pixels are able to find connected pixels that have been flagged. Consequently, only these connected neighbor pixels are flagged in Feature 1 during Iteration 1. In Feature 2, neighbor pixels located east, west, north, and south of the designated pixels are able to find connected pixels that have been flagged. As a result, these connected neighbor pixels are flagged in Feature 2 during Iteration 1. In Feature 3, only neighbor pixels located east, west, and north of the designated pixel are able to find a connected pixel that has been flagged. As such, connected neighbor pixels in all three directions are flagged in Feature 3 during Iteration 1. Features 4 and 5 have no designated pixels, and therefore none of their connected neighbor pixels are flagged during the labeling operation.

In step 1002, each process continues sequentially inspecting each neighbor pixel located in the east, west, north, and south direction to determine if that neighbor pixel is a connected pixel that has been flagged. In Feature 1, only neighbor pixels located to the east of the flagged pixels are able to find connected pixels that have been flagged. As such, only these neighbor pixels are flagged in Feature 1 during Iteration 2. In Feature 2, all remaining neighbor pixels are able to find at least one flagged connected pixel that was previously flagged during Iteration 1. Accordingly, all remaining neighbor pixels are flagged in Feature 2 during Iteration 2, and Feature 2 is labeled. Similarly, in Feature 3, all remaining neighbor pixels are able to find at least one flagged connected pixel that was previously flagged during Iteration 1. As such, all remaining neighbor pixels are flagged in Feature 3 during Iteration 2, and Feature 3 is labeled.

In step 1003, each process further continues sequentially inspecting each neighbor pixel located in the east, west, north, and south direction to determine if that neighbor pixel is a connected pixel that has been flagged. In Feature 1, all remaining neighbor pixels are able to inspect at least one flagged connected pixel that was previously flagged during Iteration 2. Consequently, all remaining neighbor pixels are flagged in Feature 1 during Iteration 3, and Feature 1 is labeled.

In step 1004, Features 1, 2, and 3 are shown as being fully labeled. Features 4 and 5, i.e., features that were not designated for labeling, are thereafter removed from the image data to eliminate undesired features.

In step 1005, the pixel value for each flagged pixel is changed back to its original pixel value, i.e., the pixel value for that pixel before the binarization process, and the remaining pixel values are set as background pixels. As a consequence, the image data in step 1005 displays only the labeled features while leaving out undesired background pixels.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for labeling image data which includes a feature, wherein the image data is comprised of pixel data for each of plural pixels arranged in an N×M array of pixels, wherein the method comprises using at least one processor to perform at least one of the steps of:
    receiving a designation of at least one pixel included in the feature;
    setting a flag for the designated pixel;
    initiating execution of N×M parallel asynchronous processes, wherein
    each such process respectively corresponds to exactly one owner pixel in the N×M array of pixels and is constrained to set a flag only for the owner pixel and no other pixels, wherein each process inspects pixel data for horizontal and vertical neighbor pixels of the owner pixel to determine if a neighbor pixel is a connected pixel and if the neighbor pixel is flagged, wherein each process sets the flag only for the owner pixel and only if the flag for a connected horizontal or vertical neighbor pixel of the owner pixel is set, wherein each process continues to check subsequent horizontal and vertical neighbor pixels of the owner pixel until the process sets the flag for the owner pixel or until all connected horizontal and vertical neighbor pixels have been inspected without encountering a connected pixel whose flag is set;
    upon termination of all of the N×M processes, repeating the step of initiating execution of N×M parallel asynchronous processes until a pre-defined condition has been satisfied; and
    labeling all pixels whose flags are set as part of the feature.

2. A method according to claim 1, further comprising the step of binarizing the image data before initiating execution of any of the N×M parallel asynchronous processes, wherein the pixel value of each flagged pixel is changed back to its corresponding pixel value in the non-binarized image after the labeling step is performed on the binarized image data.

3. A method according to claim 1, wherein the method is performed for each frame of a moving image.

4. A method according to claim 1, wherein the image data further comprises pixel data for a third dimension O so as to form an N×M×O array of pixels, and wherein the method is performed for each N×M array of pixels in the O dimension.

5. A method according to claim 1, wherein the labeled image data is a medical image which includes image data for an anatomical feature, wherein the labeling labels the anatomical feature.

6. A method according to claim 1, wherein diagonal neighbor pixels of the owner pixel are also inspected.

7. A method according to claim 1, wherein the pre-defined condition is satisfied if every pixel associated with a feature or features has been flagged.

8. A method according to claim 1, wherein the pre-defined condition is satisfied if N×M parallel asynchronous processes have been executed for a specified number of iterations.

9. A method according to claim 1, wherein the pre-defined condition is satisfied once there is an insignificant change in the number of flags set by the processes in the previous iteration.

10. An image processing apparatus, comprising:
    a computer-readable memory constructed to store computer-executable process steps; and
    a processor constructed to execute the computer-executable process steps stored in the memory;
    wherein the process steps stored in the memory cause the processor to label image data which includes a feature, wherein the image data is comprised of pixel data for each of plural pixels arranged in an N×M array of pixels, and wherein the process steps include computer-executable process steps to:

receive a designation of at least one pixel included in the feature;

set a flag for the designated pixel;

initiate execution of N×M parallel asynchronous processes, wherein each such process respectively corresponds to exactly one owner pixel in the N×M array of pixels and is constrained to set a flag only for the owner pixel and no other pixels, wherein each process inspects pixel data for horizontal and vertical neighbor pixels of the owner pixel to determine if a neighbor pixel is a connected pixel and if the neighbor pixel is flagged, wherein each process sets the flag only for the owner pixel and only if the flag for a connected horizontal or vertical neighbor pixel of the owner pixel is set, wherein each process continues to check subsequent horizontal and vertical neighbor pixels of the owner pixel until the process sets the flag for the owner pixel or until all connected horizontal and vertical neighbor pixels have been inspected without encountering a connected pixel whose flag is set;

upon termination of all of the N×M processes, repeating the step of initiating execution of N×M parallel asynchronous processes until a pre-defined condition has been satisfied; and label all pixels whose flags are set as part of the feature.

11. An apparatus according to claim 10, further comprising the step of binarizing the image data before initiating execution of any of the N×M parallel asynchronous processes, wherein the pixel value of each flagged pixel is changed back to its corresponding pixel value in the non-binarized image after the labeling step is performed on the binarized image data.

12. An apparatus according to claim 10, wherein the method is performed for each frame of a moving image.

13. An apparatus according to claim 10, wherein the image data further comprises pixel data for a third dimension O so as to form an N×M×O array of pixels, and wherein the method is performed for each N×M array of pixels in the O dimension.

14. An apparatus according to claim 10, wherein the labeled image data is a medical image which includes image data for an anatomical feature, wherein the labeling labels the anatomical feature.

15. An apparatus according to claim 10, wherein diagonal neighbor pixels of the owner pixel are also inspected.

16. An apparatus according to claim 10, wherein the pre-defined condition is satisfied if every pixel associated with a feature or features has been flagged.

17. An apparatus according to claim 10, wherein the pre-defined condition is satisfied if N×M parallel asynchronous processes have been executed for a specified number of iterations.

18. An apparatus according to claim 10, wherein the pre-defined condition is satisfied once there is an insignificant change in the number of flags set by the processes in the previous iteration.

19. A computer-readable storage medium storing a computer-executable program for causing a computer to perform a method for labeling image data which includes a feature, wherein the image data is comprised of pixel data for each of plural pixels arranged in an N×M array of pixels, the method comprising:

receiving a designation of at least one pixel included in the feature;

setting a flag for the designated pixel;

initiating execution of N×M parallel asynchronous processes, wherein each such process respectively corresponds to exactly one owner pixel in the N×M array of pixels and is constrained to set a flag only for the owner pixel and no other pixels, wherein each process inspects pixel data for horizontal and vertical neighbor pixels of the owner pixel to determine if a neighbor pixel is a connected pixel and if the neighbor pixel is flagged, wherein each process sets the flag only for the owner pixel and only if the flag for a connected horizontal or vertical neighbor pixel of the owner pixel is set, wherein each process continues to check subsequent horizontal and vertical neighbor pixels of the owner pixel until the process sets the flag for the owner pixel or until all connected horizontal and vertical neighbor pixels have been inspected without encountering a connected pixel whose flag is set;

upon termination of all of the N×M processes, repeating the step of initiating execution of N×M parallel asynchronous processes until a pre-defined condition has been satisfied; and labeling all pixels whose flags are set as part of the feature.

20. The computer-readable storage medium according to claim 19, further comprising the step of binarizing the image data before initiating execution of any of the N×M parallel asynchronous processes, wherein the pixel value of each flagged pixel is changed back to its corresponding pixel value in the non-binarized image after the labeling step is performed on the binarized image data.

21. The computer-readable storage medium according to claim 19, wherein the method is performed for each frame of a moving image.

22. The computer-readable storage medium according to claim 19, wherein the image data further comprises pixel data for a third dimension O so as to form an N×M×O array of pixels, and wherein the method is performed for each N×M array of pixels in the O dimension.

23. The computer-readable storage medium according to claim 19, wherein the labeled image data is a medical image which includes image data for an anatomical feature, wherein the labeling labels the anatomical feature.

24. The computer-readable storage medium according to claim 19, wherein diagonal neighbor pixels of the owner pixel are also inspected.

25. The computer-readable storage medium according to claim 19, wherein the pre-defined condition is satisfied if every pixel associated with a feature or features has been flagged.

26. The computer-readable storage medium according to claim 19, wherein the pre-defined condition is satisfied if N×M parallel asynchronous processes have been executed for a specified number of iterations.

27. The computer-readable storage medium according to claim 19, wherein the pre-defined condition is satisfied once there is an insignificant change in the number of flags set by the processes in the previous iteration.

28. A non-transitory computer-readable storage medium storing an image processing module for labeling image data which includes a feature, wherein the image data is comprised of pixel data for each of plural pixels arranged in an N×M array of pixels, wherein the method comprises:

a receiving module for receiving a designation of at least one pixel included in the feature;

a setting module for setting a flag for the designated pixel;

an execution module for initiating execution of N×M parallel asynchronous processes, wherein each such process respectively corresponds to exactly one owner pixel in the N×M array of pixels and is constrained to set a flag only for the owner pixel and no other pixels, wherein each process inspects pixel data for horizontal and vertical neighbor pixels of the owner pixel to determine if a neighbor pixel is a connected pixel and if the neighbor pixel is flagged, wherein each process sets the flag only for the owner pixel and only if the flag for a connected horizontal or vertical neighbor pixel of the owner pixel is set, wherein each process continues to check subsequent horizontal and vertical neighbor pixels of the owner pixel until the process sets the flag for the owner pixel or until all connected horizontal and vertical neighbor pixels have been inspected without encountering a connected pixel whose flag is set, and wherein upon termination of all of the N×M processes, the step of initiating execution of N×M parallel asynchronous processes is repeated until a pre-defined condition has been satisfied; and an output module for labeling all pixels whose flags are set as part of the feature.

29. A method for labeling image data which includes a feature, wherein the method is performed by a general purpose computer which has a CPU interfaced to a GPGPU having a SIMD architecture, wherein the image data is comprised of pixel data for each of plural pixels arranged in an N×M array of pixels, wherein the method comprises:

receiving in CPU a designation of at least one pixel included in the feature;

sending the image data from CPU to GPGPU together with the designation of the pixel;

setting a flag in GPGPU for the pixel corresponding to the designated pixel;

initiating execution of N×M parallel asynchronous processes in GPGPU, wherein each such process respectively corresponds to exactly one owner pixel in the N×M array of pixels and is constrained to set a flag only for the owner pixel and no other pixels, wherein each process inspects pixel data for horizontal and vertical neighbor pixels of the owner pixel to determine if a neighbor pixel is a connected pixel and if the neighbor pixel is flagged, wherein each process sets the flag only for the owner pixel and only if the flag for a connected horizontal or vertical neighbor pixel of the owner pixel is set, wherein each process continues to check subsequent horizontal and vertical neighbor pixels of the owner pixel until the process sets the flag for the owner pixel or until all connected horizontal and vertical neighbor pixels have been inspected without encountering a connected pixel whose flag is set;

upon termination of all of the N×M processes in GPGPU, repeating the step of initiating execution of N×M parallel asynchronous processes in GPGPU until a pre-defined condition has been satisfied;

receiving the flags from GPGPU at CPU; and labeling by CPU of all pixels whose flags are set as part of the feature.

30. A method for labeling image data which includes a feature, wherein the image data is comprised of pixel data for each of plural pixels arranged in an N×M array of pixels, wherein the method comprises using at least one processor to perform at least one of steps of:

receiving a designation of at least one pixel included in the feature;

setting a flag for the designated pixel;

initiating execution of parallel asynchronous processes each corresponding to a target pixel, each process being for setting a flag for the target pixel by determining whether at least one flagged pixel is included in connected pixels, upon termination of all of the processes, repeating the step of initiating execution of parallel asynchronous processes until a pre-defined condition has been satisfied; and labeling all pixels whose flags are set as part of the feature.

31. The method according to claim 30, wherein the process is for checking connected pixels sequentially in a specific order so as to determine whether at least one flagged pixel is included in the connected pixels.

32. The method according to claim 30, wherein the process is for checking a pixel included in the connected pixels before checking a neighboring pixel.

33. The method according to claim 30, wherein the process is for checking, one by one, if a pixel is flagged or not.

34. The method according to claim 30, wherein the connected pixels are determined on the basis of pixel values of the image data.

35. An image processing apparatus, comprising:

a computer-readable memory constructed to store computer-executable process steps; and a processor constructed to execute the computer-executable process steps stored in the memory;

wherein the process steps stored in the memory cause the processor to label image data which includes a feature, wherein the image data is comprised of pixel data for each of plural pixels arranged in an N×M array of pixels, and wherein the computer- executable process steps include steps to:

receive a designation of at least one pixel included in the feature;

set a flag for the designated pixel;

initiate execution of parallel asynchronous processes each corresponding to a target pixel, each process being for setting a flag for the target pixel by determining whether at least one flagged pixel is included in connected pixels, upon termination of all of the processes, repeat the step of initiating execution of parallel asynchronous processes until a pre-defined condition has been satisfied; and label all pixels whose flags are set as part of the feature.

36. A non-transitory computer-readable storage medium storing a computer-executable program for causing a computer to perform a method for labeling image data which includes a feature, wherein the image data is comprised of pixel data for each of plural pixels arranged in an N×M array of pixels, wherein the method comprises using at least one processor to perform at least one of steps of:

receiving a designation of at least one pixel included in the feature;

setting a flag for the designated pixel;

initiating execution of parallel asynchronous processes each corresponding to a target pixel, each process being for setting a flag for the target pixel by determining whether at least one flagged pixel is included in connected pixels, upon termination of all of the processes, repeating the step of initiating execution of parallel asynchronous processes until a pre-defined condition has been satisfied; and labeling all pixels whose flags are set as part of the feature.

* * * * *